May 5, 1936.  G. E. MURPHY  2,039,921
WORLD TIME CHART
Filed Jan. 11, 1936   2 Sheets-Sheet 1
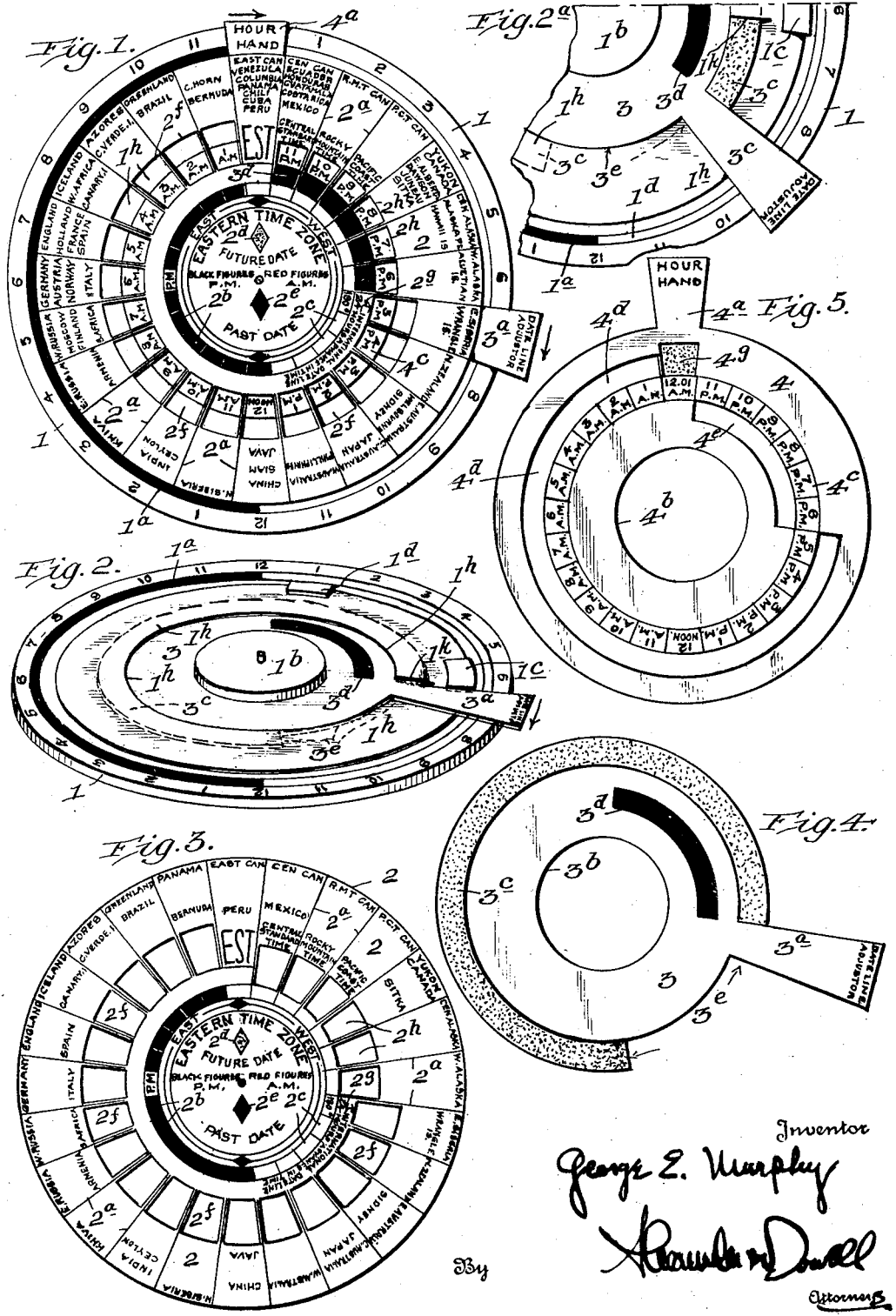
Inventor
George E. Murphy
By
Attorneys May 5, 1936.  G. E. MURPHY  2,039,921
WORLD TIME CHART
Filed Jan. 11, 1936  2 Sheets-Sheet 2
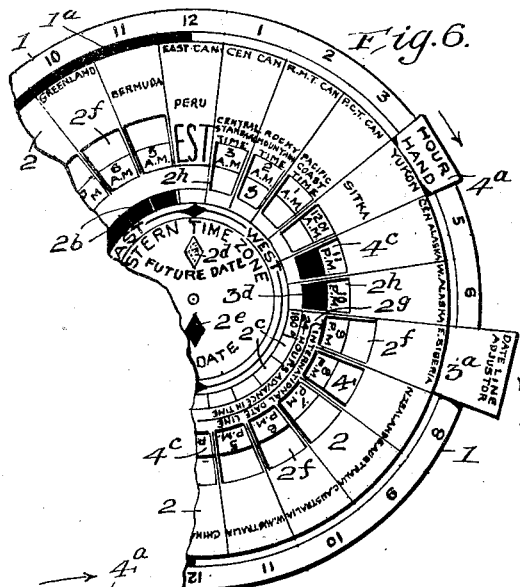
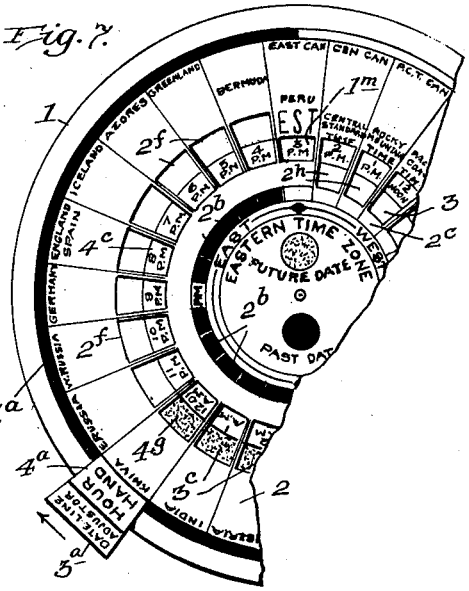
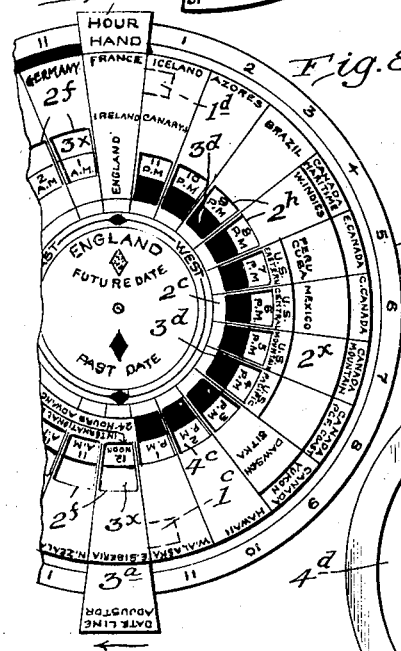
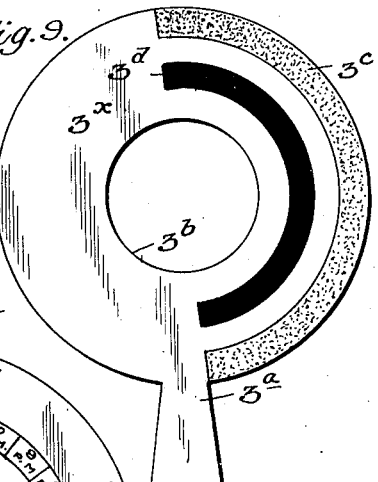
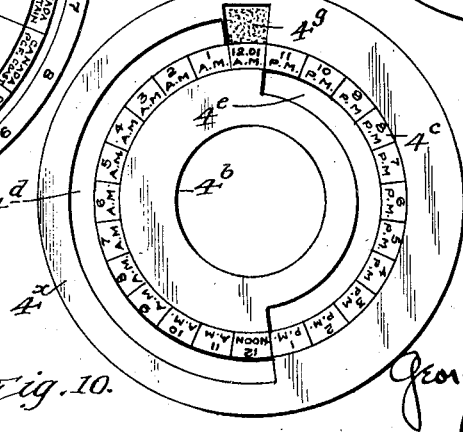

Patented May 5, 1936

2,039,921

UNITED STATES PATENT OFFICE 2,039,921

WORLD TIME CHART

George Edwin Murphy, Averill Park, N. Y.

Application January 11, 1936, Serial No. 58,767

20 Claims. (Cl. 235—88)

This invention is a novel world time chart particularly adapted for use in connection with international business transactions between persons located in different time zones; also useful in connection with short wave radio reception by persons interested in world events; and useful as an educational novelty or the like; and the principal object of the invention is to provide a world time chart which may be arranged for any particular time zone, for any country or group of countries, or for certain radio stations of any country or group of countries.

A further object of the invention is to provide means associated with the chart whereby the time desired, in relation to the particular time zone for which the chart is designed, will be visibly denoted as being of past, present or future date, contrasting colors being preferably utilized for this purpose, said means comprising an international date line adjustor disk adapted to influence all the time zones of the chart in the proper operation thereof.

A still further object of the invention is to provide a time chart which may be readily mounted on an easel to be placed on radio cabinets, or may be mounted upon the face of the cabinet itself; also a time chart which in larger sizes might be mounted upon easels or hung on the walls of school rooms and used as an educational device.

Other objects of the invention will be hereinafter set forth.

I will explain the invention with reference to the accompanying drawings which illustrate several practical embodiments thereof to enable others familiar with the art to adopt and use the same; and will summarize in the claims the novel features of construction, and novel combinations of parts, for which protection is desired.

In said drawings:—

Fig. 1 is a plan view of one form of chart featuring eastern standard time.

Fig. 2 is a perspective view of the base disk of the chart shown in Fig. 1 and showing the date-line adjustor disk mounted thereon and disposed in normal position.

Fig. 2a is a partial plan view of the base disk shown in Fig. 2, but showing the date-line adjustor disk rotated slightly from normal position to expose an arcuate length of one colored field between the tab and the slit in the cover sheet.

Fig. 3 is a plan view of the face disk of the chart shown in Fig. 1.

Fig. 4 is a plan view of the date-line adjustor disk of the chart shown in Fig. 1.

Fig. 5 is a plan view of the hour hand disk of the chart shown in Fig. 1.

Fig. 6 is a partial plan view of the chart shown in Fig. 1 showing the hour hand disk in shifted position.

Fig. 7 is a partial plan view of a modified chart featuring eastern standard time, showing the hour hand disk and date-line adjustor disk in another adjusted position.

Fig. 8 is a partial plan view of a chart modified to feature the time zone for England.

Fig. 9 is a plan view of the date-line adjustor disk of the chart shown in Fig. 8, and Fig. 10 is a plan view of the hour hand disk of the chart shown in Fig. 8.

The chart consists of four circular disks comprising a base disk 1, a face disk 2 fixedly mounted upon but spaced from the base disk, and a date-line adjustor disk 3 and an hour hand disk 4 rotatably mounted between the base and face disks 1 and 2, said rotatable disks 3 and 4 having tabs 3a, 4a, respectively projecting from their peripheries whereby the said disks may be readily adjusted.

The chart shown in Figs. 1-6 is designed to feature eastern standard time, and face disk 2 is provided with two arcuate series of slots as hereinafter described whereby certain indicia on the two rotary disks 3 and 4, when properly adjusted with relation to each other and to the base, will visibly denote the time for any particular location or point on the globe with relation to eastern standard time; and furthermore by means of contrasting colored fields, portions of which are visible through certain of the slots in the face disk 2, under certain settings of the disks 3 and 4, the time at the particular location or point in question will be visibly denoted as being of past, present, or future date with relation to eastern standard time.

Base disk 1, preferably of circular shape, may be made of celluloid, cardboard or any other suitable material, and its periphery is marked on one side of its diameter with the figures 1 a. m. to 12 (noon), and on the other side of its diameter with the figures 1 p. m. to 12 (midnight), said figures being all equally spaced apart. The figures 1 p. m. to 12 (midnight) denoting the night hours may be of contrasting color (such as black) from the figures 1 a. m. to 12 (noon) denoting the morning hours (which may be red); and preferably as shown a semi-circular dark line 1a may be provided on the disk adjacent to and embracing the figures 12 (noon) to 12 (midnight)

to denote evening from morning hours of the day.

At the center of the upper face of base disk 1 is a raised lug 1b (Fig. 2) which may be formed integral with the base or attached thereto in any desired manner, said lug forming a bearing upon which the rotary disks 3 and 4 are journaled, said disks 3 and 4 being maintained upon the lug 1b by the face disk 2 which is secured upon the upper face of the said lug. Suitable raised stops 1c, 1d, are also provided on the upper face of base disk 1 for the purpose hereinafter described.

The face disk 2 is fixedly mounted upon the upper face of the lug 1b in any desired manner, and its periphery lies within the twenty-four figures and the dark semi-circular line 1a displayed at the periphery of base disk 1; and the outer portion of face disk 2 is divided by radial lines 2a into twenty-four equally spaced divisions forming twenty-four sectors corresponding respectively with the twenty-four numbers appearing upon the periphery of the base disk 1 opposite their related sectors as shown in Fig. 1. The sector 12 (midnight) at the top of the chart denotes the particular time zone for which the chart was designed and in Fig. 1 this zone is marked "EST", denoting eastern standard time. Also in this sector are marked the names of the particular countries or portions thereof which are actually included in the eastern standard time zone. In each of the remaining twenty-three sectors are similarly marked the names of their respective countries or portions thereof. However in place of, or included with the names of the countries, the names of the principal cities, radio stations, or the like might be also marked depending upon the particular use for which the chart is designed.

At the center of face disk 2 is a circular field, the periphery of which is also marked with twenty-four divisions, and preferably the twelve divisions 2b to the left of the "EST" sector are colored black denoting p. m. Notations such as "Black figures p. m."; and "East" may also be displayed in connection with the twelve divisions 2b. The remaining twelve divisions 2c may be left colored red to agree with the coloring of the figures 1 a. m. to 12 (noon) of the base disk which denote morning hours, and associated therewith may be displayed the notations "Red figures a. m." and "West". Preferably the notation Eastern time zone is also prominently displayed at the top of the central field to denote that the particular chart was designed for this time zone; and also within the central field may be displayed a blue (or other) colored figure 2d and associated therewith the notation "Future date"; also a brown (or other) colored figure 2e associated with the notation "Past date".

The sector "EST" denoting 12 (midnight) on the face disk 2 is solid, but the sectors extending in an anti-clockwise direction around the face disk from the sector "11 p. m." to the sector "7 a. m." for Wrangle Islands, and eastern Siberia, which sector also includes the international date line, are each provided with substantially rectangular slots 2f having their inner and outer edges disposed on common pitch circles for forming an arcuate series of slots, thin spoke portions separating the slots 2f between the respective sectors in Fig. 3 as shown. Preferably, on the face disk 2 is an arrow 2g pointing to this particular international date line sector (7 a. m.) and associated with the arrow is the notation "International date line—twenty-four hours advance in time". The remaining sectors from 6 a. m. to 1 a. m. inclusive, extending from the international date line sector 7 a. m. to midnight are likewise provided with substantially rectangular slots 2h, but their inner and outer edges are disposed on pitch circles of slightly less diameter than the corresponding pitch circles of the first mentioned slots 2f. The slots 2h form a second arcuate series of slots and it will be noted that the pitch circle of the outer ends of slots 2h cuts the first mentioned slots at about their midpoints so that the outer halves of the slots 2h are aligned with the inner halves of the first mentioned slots 2f for reasons hereinafter set forth.

The hour hand disk 4 shown in Fig. 5 is of smaller diameter than the face disk 2, and is provided with a tab 4a marked "Hour hand" which extends slightly beyond the periphery of base disk 1. The hour hand tab 4a of disk 4 normally rests beneath the "EST" zone, i. e. the zone for which the chart was issued. At the center of disk 4 is a circular opening 4b adapted to rotatably engage the raised circular lug 1b on base 1, and the hour hand disk may be readily rotated around the chart between base 1 and face disk 2. Disk 4 is provided with an annular field 4c concentric with opening 4b having an interior diameter equal to the inner pitch circle of the slots 2f and its outer diameter equal to the outer pitch circle of the slots 2h, whereby the portion of the field exposed through the slots 2f will fill the inner halves of the slots 2f, and the portion exposed through slots 2h will fill the outer halves of slots 2h, as shown in Fig. 1. Field 4c is divided into twenty-four divisions, the division opposite the tab 4a being marked "12 (midnight)" or "12.01 a. m." The remaining divisions are lettered in a clockwise direction from "11 p. m." to "12 (noon)" and from "12 (noon)" to "1 a. m." as shown in Fig. 5.

Disk 4 is provided with an arcuate slot 4d extending from the division marked "1 a. m." in an anti-clockwise direction around to and terminating with the division marked "5 p. m." The outer edge of this slot is disposed on a pitch circle corresponding with the pitch circle for the outer ends of the rectangular slots 2f in the face disk 2. The inner edge of this slot however is disposed on the pitch circle of the exterior diameter of the annular field 4c. Thus when the hour hand tab 4a underlies the 12 (midnight) sector 'EST" as shown in Fig. 1, the notations 1 a. m., 2 a. m., 3 a. m. up to 5 p. m. will respectively appear at the inner ends of the rectangular slots 2f in the face disk 2 reading from the 11 p. m. sector of the base in an anti-clockwise direction around to the 7 a. m. or international date line sector. These hours appear through the slots 2f denoting the hours in the particular locations corresponding with midnight in eastern standard time zone.

A second arcuate slot 4e is provided in disk 4 embracing the divisions 6 p. m. and 11 p. m. as shown in Fig. 5. The inner edge of slot 4e is disposed on a pitch circle equal to the pitch circle of the inner ends of slots 2h in the face disk 2, but the outer edge of this slot is disposed on the pitch circle of the inner diameter of the annular field 4c of disk 4, so that when the hour hand tab 4a is under the 12 (midnight) sector of the face disk the notations 6 p. m. to 11 p. m. will appear through the slots 2h of the face disk 2 at the outer portions thereof, as shown in Fig. 1.

The slot 4d terminates at the "1 a. m." division of the annular field 4c, and on the disk 4 opposite the end of slot 4d, below the tab 4a, and directly above the "12 (midnight)," division, is a rectangular field 4g which is colored blue, and which is adapted to be displayed through the outer portions of slots 2f for the purpose hereinafter described.

Between the hour hand disk 4 and base 1 is the date line adjustor disk 3 (Fig. 4) having a tab 3a projecting somewhat beyond the periphery of the base disk 1 which tab is marked "Date line adjustor". The disk 3 is provided for the purpose of indicating by the use of contrasting colors whether or not the time denoted in any desired sector is past, present, or future, with respect to eastern standard time; and as an illustration I use the color blue to denote future date, white to denote present date, and brown to denote past date. The tab 3a is adapted to be limited by the stops 1d, 1c on the base 1 to arcuate movement only within the limits of zone 7 a. m. containing the international date line and the zone for 12 (midnight). The date line adjustor tab 3a of disk 3 normally rests beneath the sector "7 a. m." of the base 1 to which the international date line arrow 2g points, but this tab 3a is always carried along with the hour hand tab 4a when the latter passes over same within the limits of the sectors 7 a. m. and 12 midnight.

At the center of disk 3 is a circular opening 3b adapted to rotatably engage the raised central lug 1b on base 1 whereby the disk 3 may rotate thereon. The periphery of disk 3 is preferably of the same diameter as the pitch circle for the outer ends of the slots 2f in the face disk 2; and as shown in Fig. 4 the periphery of disk 3 has a blue arcuate field 3c of substantially 285° in length extending from the tab 3a in an anticlockwise direction, said field being adapted to be displayed through the outer portions of the slots 2f in certain positions or settings of the disks 3 and 4. As shown in Figs. 2 and 2a an annular cover sheet 1h of somewhat greater diameter than disk 3 is secured at its outer periphery upon the upper face of base 1, the inner diameter of sheet 1h being of same or slightly smaller diameter than the inner diameter of the blue field 3c of disk 3 so as to normally cover same as shown in Fig. 2. Tab 3a of disk 3 normally rests against stop 1c so as to lie in the international date line sector (7 a. m.), and in the cover sheet 1h is a slit 1k (Figs. 2 and 2a) opposite the near end of the stop 1c through which the periphery of disk 3 passes from beneath to above the cover sheet 1h, the tab 3a always engaging the upper face of cover sheet 1h. When the tab 3a is in normal position shown in Fig. 2 no portion of the blue field 3c will be exposed and hence this color will not be visible through any of the slots 2f in the face disk due to the fact that the cover sheet 1h hides the field 3c from view, but when the tab 3c is turned or shifted clockwise as indicated in Fig. 2a an arcuate band of blue will be exposed, which band will be visible through all the slots 2f, when both tabs 3a, 4a, have been rotated into the 12 (midnight) sector at the top of the chart.

The blue field 3c is of arcuate length slightly more than sufficient to embrace all the slots 2f when the arm 3a is in the 12 (midnight) sector; and to facilitate assembly of parts, the periphery of disk 3 has a recess 3e between the trailing end of field 3c and the tab 3a. In order to insert the disk 3 under the cover sheet it is merely necessary to place the trailing end of field 3c (adjacent recess 3e) through slit 1k under the cover sheet 1h and then rotate the disk 3 in an anticlockwise direction around into the normal position shown in Fig. 2.

On the disk 3 is a second arcuate colored field 3d to denote past date, said field being preferably colored brown or other contrasting color, which color is displayed through the inner ends of the rectangular slots 2h for the sectors 1 a. m. to 6 a. m. of the base disk 1 when the parts are in normal position shown in Fig. 1. The field 3d lies between the blue field 3c and the center of disk 3 and extends from the tab 3a around in an anti-clockwise direction sufficiently to embrace the slots 2h of the face disk when the parts are in normal position.

When the parts are in normal position, with the hour hand tab 4a overlying the "12 (midnight)" sector of the base and the tab 3a overlying the international date line sector "7 a. m.", it will be seen that when it is midnight eastern standard time the time in the zone including western Alaska is 6 p. m. and since the brown color denoting past date appears also in the slot 2h for this zone the chart visibly denotes that the time is of the day before; while in the zone for eastern Siberia the time is denoted as 5 p. m. and since the color brown is not then shown in the corresponding slot 2f the time is denoted as being of the same day; also that in Java it is 12 noon of the same day. In the Ceylon zone the time is 10 a. m. of the same day, i. e., 10 hours ahead, while in the Bermuda zone the time at 1 a. m. of the same day, or only one hour ahead.

Bearing in mind that the above chart was prepared for eastern standard time and that the date line adjustor tab 3a normally rests beneath the 7 a. m. zone of the chart, which zone includes the international date line and that tab 3a may travel from that zone to 12 midnight only when said tab is carried along with the movement of the hour hand tab 4a, when the latter overtakes same moving in a clockwise direction, the chart may be operated as follows in determining time in different zones.

Assuming that the hour is 4 a. m. "EST" and the time on the Pacific coast is desired, move hour hand tab 4a clockwise to cover the 4 a. m. sector of the base as shown in Fig. 6. The hour appearing in the slot 2h for the Pacific coast time sector is 1 a. m., and since no color (blue or brown) appears in the Pacific coast time sector the time is denoted as being of the same day, i. e. three hours earlier. In Bermuda the time is 5 a. m. of the same day. In western Alaska the time is 10 p. m., but since the brown color appears in the slot 2h for such zone the time denoted is actually of the day before. In New Zealand however the time is 8 p. m. of the same day.

Again assuming that the hour is 3 p. m. E. S. T. and the time in Greenland is desired, move the hour hand tab 4a to cover the 3 p. m. sector of the base, remembering to move the date line adjustor tab 3a along with tab 4a when the latter overtakes same as shown in Fig. 7. The time shown in the slot 2f for the Greenland sector is 5 p. m. and since no color appears in the Greenland slot the time is denoted as being of the same day, or 2 hours later. However the time in the zone for India is denoted as 1 a. m. and since the color blue appears in the slot 2f for this zone the time is denoted as being of next day; and in the zone for Khiva the time is 12 (midnight) entering the next day.

All problems are completed on the hour, with the additional minutes, if any, added, when the hour for a particular country or radio station is found. For example if it is 1:40 a. m. "EST" and the time in the Philippine Islands is wanted, move the hour hand tab 4a to cover 1 a. m. on the time. The hour shown in the division which includes Philippines is 2 p. m. of the same day. Then adding the odd 40 minutes to the above time will give the correct time in the Philippine Islands as 2:40 p. m.

Fig. 7 shows a modification of the eastern time chart in which the twenty-four numbers (denoting hours), on the periphery of base 1 are omitted, and a rectangular opening 1m is provided in the featured zone (E. S. T.) sector. In this modification instead of moving the tab 4a to cover certain hour notations on the periphery of the base, the tabs are manipulated until the desired hour a. m. or p. m. appears through the opening 1m, and the answer is read in the slot 2f or 2h corresponding with the zone of the location in question. Hence this chart (Fig. 7) may be used as follows:—Assume that the chart featured short wave radio stations, instead of countries and the user is listening to "EAQ" in Spain. During the program, mention is made of a Spanish broadcast to take place later in the day, say 8 p. m. To find the time to tune in, locate the zone division that includes Spain—turn the tabs 4a, 3a until 8 p. m. appears in that division (Fig. 7), and the hour appearing through slot 1m will be 3 p. m. of the same day. Thus where the time in a locality or country is known, and you wish to know what the time would be in E. S. T. it is only necessary to turn the tabs as usual, until the hour appeared under the division in which that locality or country is listed, and instead of looking under the tabs 4a, 3a for the "E. S. T." hour desired, it is only necessary to observe the hour in opening 1m of the featured time zone division. Again as shown in Fig. 7, when it is 3 p. m. E. S. T., the time in England is 8 p. m. or 5 hours later, while in Khiva it is 12 (midnight) entering the next day, or 9 hours ahead.

In Figs. 8–10 a modified chart is shown, designed for England. This modification involves a change in the international date line adjustor disk 3x, hour hand disk 4x and face disk 2x and base 1x. As will be seen (Fig. 8) the international date line sector for this chart is diametrically opposite the sector for England and hence there are the same number of slots 2h as there are slots 2f in the face disk 2. On the base, the stops 1c, 1d are disposed to limit movement of the date line adjustor tab 3a between the zones for 12 (noon) and 12 (midnight). The hour hand disk 4x is correspondingly modified and the slot 4d embraces only the divisions 1 a. m. around in an anti-clockwise direction to and including the 12 (noon) division; while slot 4e embraces the divisions 11 p. m. around in a clockwise direction to and including the division 1 p. m. Also the date line adjustor disk 3x is correspondingly modified as shown in Fig. 9, the blue field 3c and brown field 3d both extending from the tab 3a in an anti-clockwise direction on the same side of the disk through an arcuate length of 180°.

In this modification no cover sheet 1h is needed on the base 1x for the blue field 3c of disk 3x merely because as shown in Fig. 8 when the parts are in normal position all the slots 2h display the brown colored field 3d and all the slots 2f display the white color of the blank side of disk 3x. As the tab 4a is rotated in clockwise direction around to meet the tab 3a the brown colors disappear in sequence from the slots 2h so that when the tab 4a lies over the 11 a. m. sector no color brown (or blue) appears in any slot 2h (or 2f). When however tab 4a overlies tab 3a the blue field 4g of disk 4x will appear in the 12 (noon) zone, and continued movement of the superimposed tabs 4a, 3a around in a clockwise direction from the 12 (noon) sector to the 12 (midnight) sector will cause the blue colored field 3c to appear in sequence in the slots 2f for the sectors corresponding with the position with the tabs during such movement.

Hence when it is 12:01 a. m. in England, as shown by the setting of the tabs in Fig. 8, it is 1:01 a. m. of the same day in Germany, while it is 11 p. m. of the day before in Iceland as indicated by the color brown appearing in the slot 2h for Iceland.

The charts may be readily modified to feature any particular time zone, the information therefore being readily selected from a master chart or from zone maps; and the provision of the international date line adjustor disk 3 and 3x and its influence on all time zones being the dominant feature of my invention.

I claim:—

1. In a world time chart having a face disk divided into twenty-four time zones each containing related geographical notations, one of said zones comprising the featured zone of the chart, and said disk having openings in the zones; and said chart having an hour hand disk movably mounted behind the face disk and having a field, portions of which are displayed through the openings, and which field is divided into twenty-four divisions denoting the hours of the day and night; means cooperating with the hour hand disk for denoting whether the relative date displayed by the hour hand disk through said openings is past, present, or future with respect to the featured zone time.

2. In a chart as set forth in claim 1, said means being movable with the said hour hand disk between the limits of the international date line zone and the featured zone.

3. In a chart as set forth in claim 1, said means comprising a date line adjustor disk rotatably mounted behind the hour hand disk, both said disks having cooperating portions appearing in the openings with the annular field to denote the change in relative dates as the disks are rotated.

4. In a chart as set forth in claim 1, said means comprising a date line adjustor disk rotatably mounted behind the hour hand disk, and both said disks having cooperating portions appearing in the openings with the annular field to denote by change of color displayed the change in relative dates as the disks are rotated.

5. In a chart as set forth in claim 1, said means comprising a date line adjustor disk rotatably mounted behind the hour hand disk and having colored field portions cooperating with slots in the hour hand disk and registering with the openings in the face disk, the said color displayed changing according to the relative dates displayed through the openings by the annular field as the disks are rotated.

6. In a chart as set forth in claim 1, the series of openings extending in one direction from and including the international date line zone to the featured zone being disposed on a different pitch circle than the remaining series; and the hour hand disk having arcuate slots therein embracing each series when the division 12 (midnight) of its annular field is in the featured zone; and said means comprising a date line adjustor disk rotatably mounted behind the hour hand disk and having a colored arcuate field denoting past time adapted to be visible through one of the arcuate slots and through the related openings when the 12 (midnight) division of the annular field is in the featured zone; said date line adjustor disk having a second arcuate field of contrasting color denoting future time adapted to be visible through the other arcuate slot and through the related openings in another position of the disks, and means for maintaining a third colored field denoting present time visible through the latter mentioned slot and openings from the date line adjustor zone around in one direction to the featured zone until the date line adjustor disk has been shifted in said direction.

7. In a chart as set forth in claim 1, the series of openings extending in one direction from and including the international date line zone to the featured zone being disposed on a different pitch circle than the remaining series; and the hour hand disk having arcuate slots therein embracing each series when the division 12 (midnight) of its annular field is in the featured zone; and said means comprising a date line adjustor disk rotatably mounted behind the hour hand disk and having a tab normally disposed in the international date line zone, and having a colored arcuate field denoting past time adapted to be visible through the arcuate slot and through the related openings from the international date line zone around in an anti-clockwise direction to the featured zone when the 12 (midnight) division of the hour hand disk is displayed in the featured zone and when the tab is in normal position; said date line adjustor disk having a second colored arcuate field of contrasting color denoting future time adapted to be displayed through the other arcuate slot and through the related openings when the 12 (midnight) division of the hour hand disk is rotated in a clockwise direction to overtake the international date line sector and the two disks have been simultaneously moved from the date line sector in said same direction around to the featured zone; and means for maintaining a third colored field denoting present time visible through the latter slot and openings from the date line zone around in a clockwise direction to the featured zone while the tab is in normal position.

8. In a chart as set forth in claim 1, the series of openings extending in one direction from and including the international date line zone to the featured zone being disposed on a larger pitch circle than the remaining series; and the hour hand disk having arcuate slots therein embracing each series when the disk is in normal position with the division 12 (midnight) in the featured zone; and said means comprising a date line adjustor disk rotatably mounted behind the hour hand disk and having a tab normally disposed in the international date line zone, and having a colored arcuate field denoting past time adapted to be visible through the arcuate opening and through the related openings from the international date line zone around in an anti-clockwise direction to the featured zone when the hour hand disk and the tab are in normal positions; said date line adjustor disk having a second colored arcuate field of contrasting color denoting future time adapted to be displayed through the other arcuate slot and through the related openings when the hour hand disk has been rotated to overtake the tab moving in a clockwise direction and when the two disks have been simultaneously moved from the date line zone in said same direction around to the featured zone; and an annular cover sheet of a third contrasting color denoting present time fixed to the base sheet and disposed over the second field of the date line adjustor disk, said cover sheet having a slit therein opposite the international date line zone through which the marginal portion of the said disk passes from a position beneath the cover sheet to a position above said sheet to display the second colored field by and with the movement of the tab from normal position, thereby maintaining the third colored field visible through the openings from the date line zone around in a clockwise direction to the featured zone while the tab is in normal position.

9. A world time chart, comprising a member having a circular field divided into twenty-four time zones each containing related geographical notations, one of the zones constituting the featured zone for which the particular chart was designed; said member having two arcuate series of openings in the zones respectively extending in opposite directions from the featured zone to the zone containing the international date line; said series being disposed on different pitch circles with portions of the openings of both series overlapping; a sheet rotatably mounted with respect to the member and having an annular field, portions of which are visible through part of each opening of each series; said field having twenty-four divisions denoting in succession the hours of the day and night; and having two arcuate slots therein adapted in one position to embrace the remaining parts of each series of openings; and a second sheet rotatably mounted below the first sheet and having arcuate fields of contrasting colors thereon denoting past, present and future date respectively adapted to be displayed through the slots of the first sheet, the colors displayed automatically changing in accordance with the relative dates as the first sheet is rotated from the featured zone to the international date line zone, and as both sheets are simultaneously rotated from the international date line zone around to the featured zone.

10. In a chart as set forth in claim 9, a base below the second sheet and secured to said member; the periphery of the base extending beyond the member and bearing indicia opposite the time zones denoting respectively the twenty-four hours of the day and night.

11. In a chart as set forth in claim 9, a base having a cylindrical raised lug coaxial with the time zones, and said member being fixedly mounted on the lug; and said first and second sheets having circular axial openings therein receiving the lug, whereby the sheets are rotatably mounted on the base.

12. A world time chart, comprising a member having a circular field divided into twenty-four time zones each containing related geographical notations, one of the zones constituting the featured zone for which the particular chart was designed; said member having an arcuate series of openings in the respective zones embracing the one adjacent the featured zone and the one which contains the international date line; said member having a second arcuate series of openings embracing all the remaining zones respectively except the featured zone and disposed on a different pitch circle from the openings of the first series; a sheet rotatably mounted with respect to the member and having an annular field portions of which are visible through part of each opening of each series; said field having twenty-four divisions denoting in succession the hours of the day and night; a projection extending from the sheet opposite the division denoting 12 (midnight) and normally disposed in the featured zone; said sheet having two arcuate slots therein which when the sheet is in normal position embrace the remaining parts of each series of openings; and a second sheet rotatably mounted below the first sheet and having a projection normally disposed in the international date line zone; said second sheet having arcuate fields of contrasting colors thereon denoting past, present and future date respectively adapted to be displayed through the slots of the first sheet, the colors displayed automatically changing in accordance with the relative dates when the first mentioned projection is shifted from normal position in a clockwise direction to overlie the second projection, and as the two projections are simultaneously shifted in the said direction from the international date line zone to the featured zone.

13. In a chart as set forth in claim 12, a base below the second sheet and secured to the said member; the periphery of the base extending beyond the member and bearing indicia opposite the time zones denoting respectively the twenty-four hours of the day and night; the hour 12 (midnight) being disposed opposite the featured zone.

14. In a chart as set forth in claim 12, a base having a cylindrical raised lug coaxial with the time zones, and said member being fixedly mounted on the lug; and said first and second sheets having circular axial openings therein receiving the lug, whereby the sheets are rotatably mounted thereon.

15. In a chart as set forth in claim 12, the pitch circle of the outer edges of the openings of the second series bisecting the openings of the first series, and the annular field of the first sheet embracing the overlapping portions of the openings of both series.

16. In a chart as set forth in claim 12, the colored arcuate field on the second sheet denoting past date extending from the tab of said sheet and embracing part of the openings of all the slots in the second series when the tab is in normal position, the second arcuate field of contrasting color denoting future date extending from the tab and embracing part of the openings of all the slots in the first series as the tab is moved from normal position around into the featured zone; and means for displaying the third colored field denoting present date in the openings of the first series until the second tab has shifted from normal position.

17. In a chart as set forth in claim 12, the colored arcuate field on the second sheet denoting past date extending from the tab of said sheet and embracing part of the openings of all the slots in the second series when the tab is in normal position, the second arcuate field of contrasting color denoting future date extending from the tab and embracing part of the openings of all the slots in the first series as the tab is moved from normal position into the featured zone; and a fixed annular cover sheet on the member disposed over the second colored field of the second sheet, said cover sheet having a slit therein opposite the international date line sector through which the marginal portion of the second sheet passes from a position beneath to a position above the cover sheet, whereby the second colored field of the second sheet is prevented from appearing in the openings of the first series until the second tab has shifted from normal position.

18. In a chart as set forth in claim 12, said first sheet having a colored field thereon denoting future date disposed below the tab and above the 12 (midnight) division of the annular field, and adapted to be displayed through the first mentioned series of slots as the first tab is moved from the international date line zone around to the featured zone, said field forming the advancing end of the correspondingly colored field of the second sheet.

19. In a chart as set forth in claim 12, the featured zone of the member having a slot therein displaying the annular field of the said sheet.

20. In a chart as set forth in claim 12, means for limiting the second tab to movement in a clockwise direction from the international date line sector around to the featured zone.

GEORGE EDWIN MURPHY.